United States Patent [19]
Blackman et al.

[11] Patent Number: 5,806,202
[45] Date of Patent: Sep. 15, 1998

[54] RETRACTABLE TAPE MEASURE WITH SLIDING LOCK

[75] Inventors: William C. Blackman, Raleigh; Edgar T. Gilliam, Franklinton, both of N.C.

[73] Assignee: Cooper Industries, Inc., Houston, Tex.

[21] Appl. No.: 689,474

[22] Filed: Aug. 8, 1996

[51] Int. Cl.⁶ .................................................. G01B 3/10
[52] U.S. Cl. .......................................... 33/767; 242/381.3
[58] Field of Search .............................. 33/761, 767, 769, 33/755; 242/381.3, 396.5

[56] References Cited

U.S. PATENT DOCUMENTS

| | | |
|---|---|---|
| 3,214,836 | 11/1965 | West . |
| 3,689,004 | 9/1972 | Brown et al. . |
| 3,716,201 | 2/1973 | West . |
| 3,942,738 | 3/1976 | Rutty ......................................... 33/767 |
| 4,293,058 | 10/1981 | Burton ....................................... 33/767 |
| 4,578,867 | 4/1986 | Czerwinski et al. ....................... 33/761 |
| 5,007,178 | 4/1991 | Dewire et al. ............................. 33/767 |
| 5,379,523 | 1/1995 | Wingert ..................................... 33/767 |
| 5,531,395 | 7/1996 | Hsu ........................................... 33/767 |
| 5,575,077 | 11/1996 | Jung Tae .................................... 33/767 |

FOREIGN PATENT DOCUMENTS 531570  3/1993  European Pat. Off. ................. 33/767

*Primary Examiner*—Thomas B. Will
*Assistant Examiner*—Andrew Hirshfeld
*Attorney, Agent, or Firm*—Burns, Doane Swecker & Mathis LLP

[57] ABSTRACT

A slide lock for a power return measuring tape includes an elongated lock member slidably mounted in a casing. The lock member has a resilient locking tongue and follower pins extending laterally from lock member. The follower pins engage guide in the casing, which includes a guiding surface formed by a ridge in each side wall to engage the pins, the guiding surface defining a descending path to guide the tongue from a position above a measuring tape in the housing to a position in contact with the measuring tape. A lock surface is formed at a lower end of the guiding surface with a protrusion at a junction between the guiding surface and the lock surface. Movement of the pins over the protrusion to the lock surface forces the tongue in contact with the measuring blade and causes the tongue to bend to apply a clamping force to the measuring blade. The movement of the pins over the protrusion produces a snap action of the lock member, which provides a tactile and auditory indication that the lock member is in the locked position.

9 Claims, 4 Drawing Sheets

RETRACTABLE TAPE MEASURE WITH SLIDING LOCK

FIELD OF THE INVENTION

The invention is directed to retractable tape measures having power return mechanisms. More particularly, the invention is directed to a mechanism to lock the measuring tape blade in a position extended from a housing.

BACKGROUND AND SUMMARY

Power return tape measures typically include a mechanism to lock the measuring tape blade in a selected extended position. Known types of lock mechanisms include sliding and rocking devices. Conventional sliding lock mechanisms suffer from several disadvantages, including relying only on friction between the lock member and the casing guide to maintain the locking mechanism in the selected position. Such lock devices lack a positive action, accompanied by a snap or click, for example, to secure the mechanism in locking position and indicate to the user that the lock is engaged in the locking position. In addition, conventional slide lock devices require a relatively large amount of space in the casing, and to a certain extent dictate the shape and look of the casing.

The invention provides an improved slide lock mechanism that overcomes these disadvantages. A slide lock according to the invention includes an elongated lock member having a resilient locking tongue extending longitudinally from a lower end of the lock member. Followers, configured as pins, extend laterally from lock member and engage guide means in the housing for the measuring tape. The guide means includes a guiding surface formed by a ridge in each side wall against which the pins ride. The guiding surface defines a descending path to guide the tongue from a position above a measuring tape in the housing to a position in contact with the measuring tape.

According to the invention, detente means is provided at a lower end of the guiding surface to releasably secure the pins in a locked position. The detente means may be formed as a protrusion or bump-like projection at a lower end of the guiding surface over which the pins may travel and become secured against. Movement of the pins over the detente means causes the tongue to bend between the detente means and the tape blade to produce a clamping force on the measuring tape blade.

According to a preferred embodiment, the detente means includes a lock surface formed at a lower end of the guiding surface with a protrusion between the guiding surface and the lock surface. The lock surface defines a plane that intersects a plane of the guiding surface so that a protrusion is formed as a corner between the descending guiding surface and the lock surface. Alternatively, the protrusion may be formed as a bump or ridge between the guiding path and lock surface. Positioning the pins on the lock surface produces a bend in the tongue exerting a force between the lock surface and the tape blade to produce a clamping force on the measuring tape blade.

According to another aspect of the invention, movement of the pins over the detente means involves a snap action of the lock member, which provides a tactile and audible indication that the lock member is in the locked position.

The guide means includes a lower edge formed in the side wall opposite the guiding surface defining a groove. A portion of the lower edge opposite the protrusion is curved toward the lock surface, which assists in guiding the pins over the protrusion.

According to another aspect of the invention, the lock member body is curved to fit a curvature of the housing to occupy a minimal space in the housing. The guiding surface is formed on a similarly curved plane.

According to yet another aspect of the invention, the tongue has a first portion having a curve corresponding to the curve of the lock member body, that is, continuing in the curvature of the lock member, and a second portion extending from the first portion and bent in a direction opposite the curvature of the first portion. The bend of the second portion orients the tip of the tongue for contact with the measuring tape and provides a flexible portion for producing the locking force on the tape.

The lock members, and particularly the tongue, are formed of a resilient, flexible material, so that the tongue bends resiliently in a spring-like manner to provide clamping force to the tape blade. The lock surface and bearing means are oriented substantially in opposition so that the force produced by the tongue acts on the lock surface and the tape blade.

BRIEF DESCRIPTION OF THE DRAWINGS

The invention may be understood by reference to the following description in conjunction with the appended drawings, in which.

DETAILED DESCRIPTION

Figure 1:
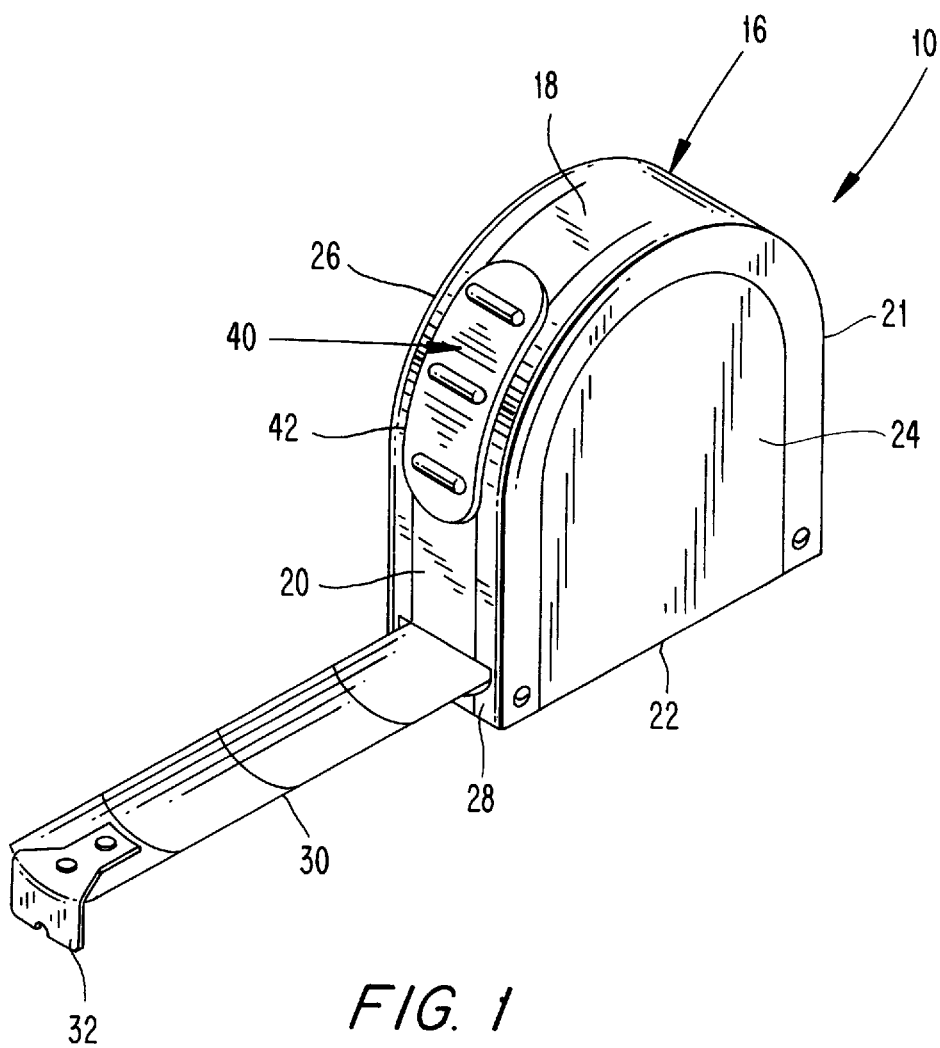
FIG. 1 is a perspective view of an illustrative measuring tape device in accordance with the invention.

A tape measure device 10 having a locking device in accordance with the invention is illustrated in FIG. 1. The locking device is particularly advantageous for use in a tape measure device as illustrated, however, the locking device is not limited to the particular configuration shown and may be used in differently shaped tape measure devices, as will be appreciated by those skilled in the art.

The tape measure device 10 includes a housing having a peripheral wall 16 including an upper peripheral wall 18, a front wall portion 20 and rear wall portion 21, and also includes a bottom wall 22, and opposing side walls 24, 26. The upper peripheral wall 18 has a curvature that is substantially semicircular and merges with the front portion 20 and rear portion 21, both of which are substantially perpendicular to the bottom wall 22. As may be seen in FIG. 2 and FIG. 3, the housing has a D-shaped profile defined by the peripheral wall 16 and the bottom wall 22. The locking device according to the invention is advantageously configured to fit within the space limits imposed by the D-shaped profile. A housing for use in connection with the invention should not be construed as strictly limited to the shapes as shown, rather, the housing and walls may take other convenient shapes as will be appreciated by those skilled in the art.

Figure 2:
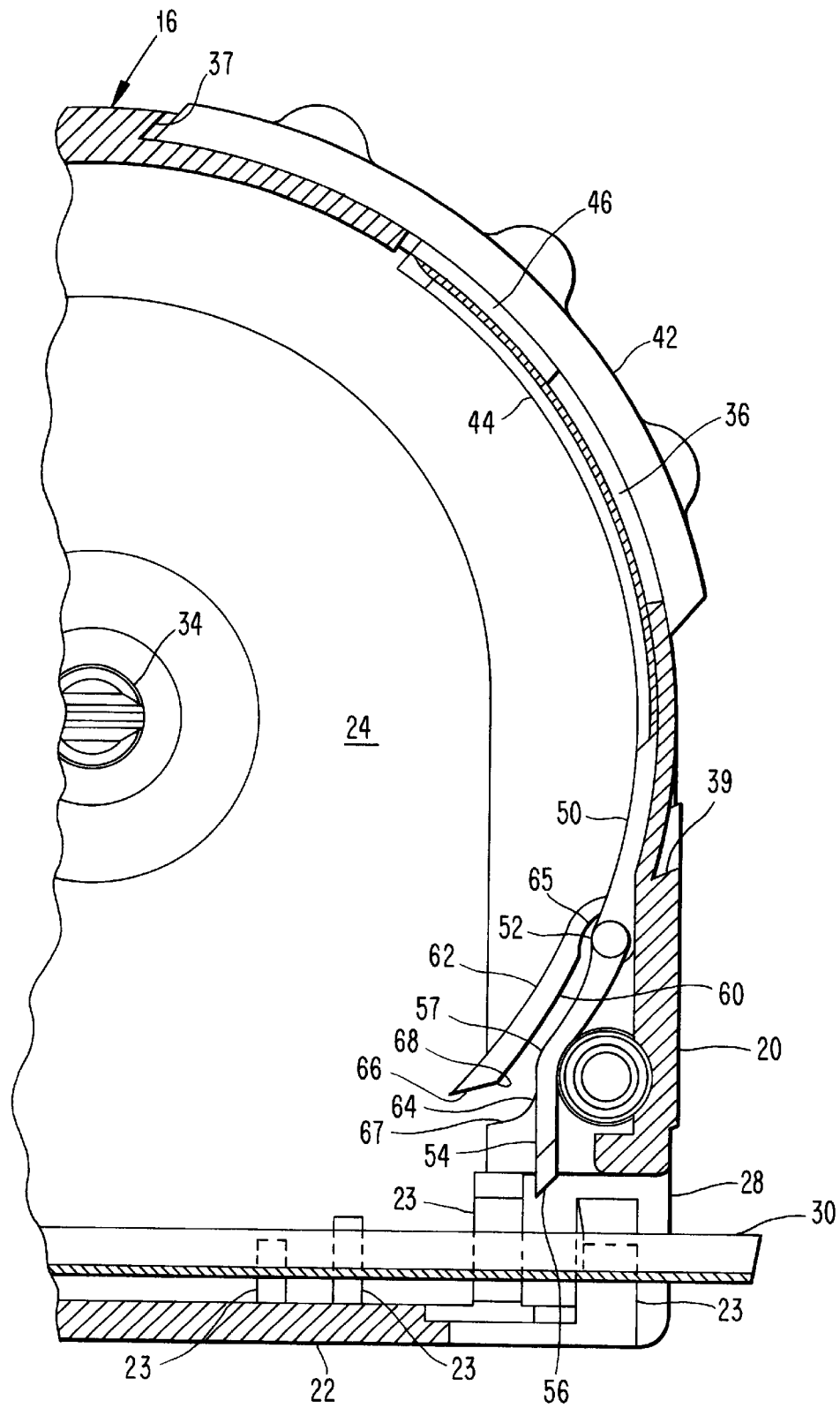
FIG. 2 is a section view of the tape measure device of FIG. 1 showing a locking device in accordance with the invention in an unlocked position.
Figure 3:
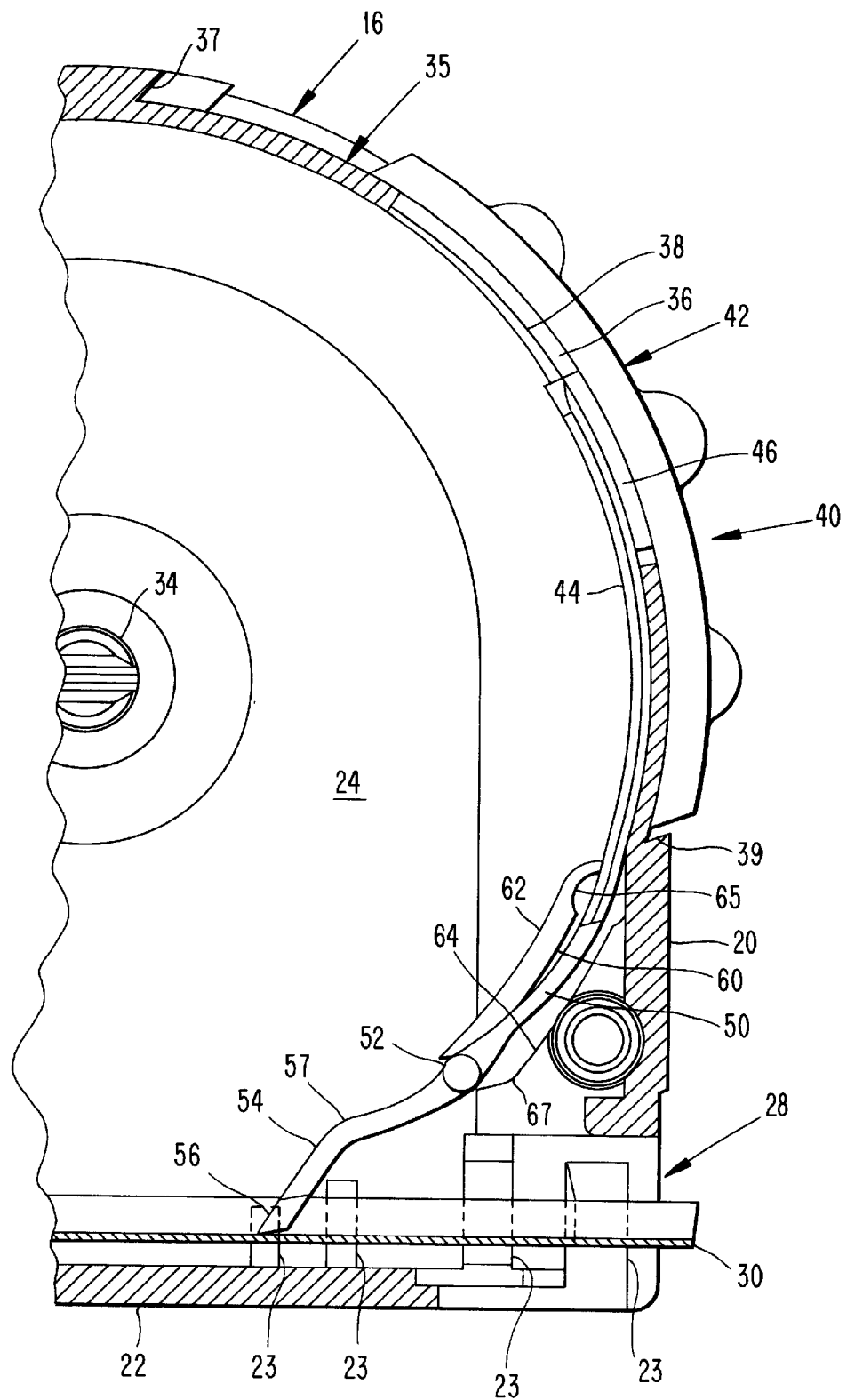
FIG. 3 is a view of the tape measure device as in FIG. 2 showing the locking device in a locked position.

A coilable measuring tape 30 (only illustrated in part) is mounted coiled on a shaft 34 and includes a spring-powered return mechanism (not illustrated) as known in the art. The tape blade 30 is formed from a metal strip curved about the longitudinal axis. A free end of the tape blade 30 with an end hook 32 extends from the housing through an opening 28 formed between the front 20 and bottom 22 walls. Referring to FIGS. 2 and 3, bearing means 23 is disposed at an inner side of the bottom wall 22 to support and guide the tape blade 30 across the bottom wall and through the opening 28. The bearing means 23 may be formed by any convenient structure. In the illustrated embodiment, the bearing means 23 comprises a plurality of upstanding ribs 23 molded in the housing, each rib having an arcuate upper surface to match the shape of the tape blade 30.

The tape measure device 10 includes a lock member 40, of which a finger pad 42 is visible in FIG. 1. The lock member 40 is positionable to lock the tape blade 30 against the bearing means 23 to prevent the power return mechanism from retracting the tape blade into the housing. The finger pad 42 is disposed on an outer surface of the peripheral wall 16 and is manually slidable along the upper peripheral wall 18 and front wall portion 20 to selectably position the lock member 40 in a locked or unlocked position.

FIG. 2 and FIG. 3 show a half section of the measuring tape 10 viewed in the direction of an interior of the side wall 24. A mating half section including side wall 26, while not illustrated, is symmetrical to the section shown in FIGS. 2 and 3, and the following description should be understood to apply to the mating half section as well. The tape blade 30 is shown in longitudinal section for clarity. FIG. 2 shows the lock member 40 in an unlocked position and FIG. 3 shows the lock member in a locked position.

Figure 4:
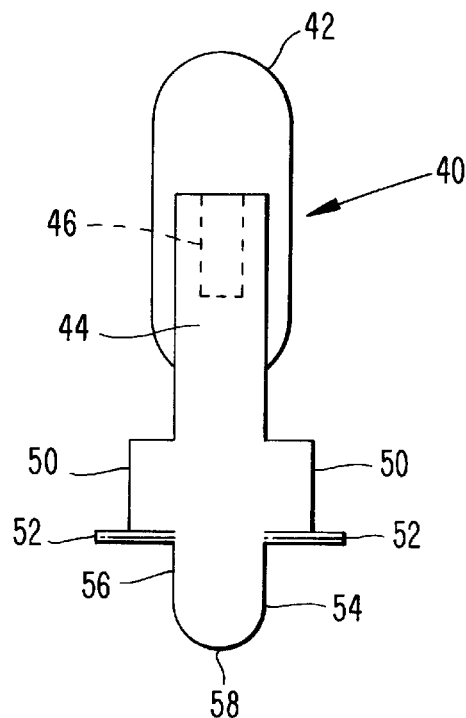
FIG. 4 is a front view of a slide lock member in accordance with the invention; and, FIG. 5 is a view of a portion of the tape measure device as in FIG. 2 showing the lock tongue in an intermediate position in contact with the tape blade.

The lock member 40 includes a body 44 slidably mounted in the housing. The body 44 is illustrated in FIG. 4 separated from the housing. The body 44 is an elongated, curved member and supports the finger pad 42 by a rib 46 projecting outward from body 44. A lower portion of the body 44 includes laterally extending wings 50 with pins 52 extending laterally outward from the wings at the lower end of the body. A spring tongue 54 extends longitudinally from the lower end and includes a lower portion 56 that contacts and clamps the tape blade 30 against the bottom wall 22 of the housing to lock the tape blade (FIG. 3).

As may be seen in FIGS. 2 and 3, the lock member 40 is curved to match the curvature of the upper peripheral wall 18 of the housing. The upper portion of the tongue 54 has a curve that follows the curvature in the body 44, and includes a bend 57 directing the lower portion 56 of the tongue in the opposite direction toward the bottom wall 22. The bend 57 orients the tongue end portion 56 so that a tip contacts the tape blade 30.

Referring to FIGS. 2 and 3, the housing includes guide means to control the sliding movement of the lock member 40. The guide means includes a slotted aperture 36 formed in the upper peripheral wall 18 in which the rib 46 is disposed, thus positioning the finger pad 42 on an outer surface of the upper peripheral wall 18 and the body portion 44 on an inner surface of the upper peripheral wall 18. The outer surface of the peripheral wall 16 is recessed around the slotted aperture 36 to provide a bed 35 for the finger pad 42. At opposite ends of the bed 35, stop walls 37, 39 are formed to limit the sliding movement of the pad 42 and lock member 40. The inner surface of the upper peripheral wall 18 adjacent the slotted aperture 36 is also recessed to provide a channel 38 with opposing edges on either side of the slotted aperture 36. The body 44 is disposed in the channel 38 which guides the body 44 along the upper peripheral wall 18.

The recessed portion of the upper peripheral wall 18, on the inner and outer sides of the peripheral wall 16, provides a reduced-thickness section of the upper peripheral wall 18 which accommodates the lock member 40, giving the housing a minimal thickness profile.

The guide means also includes a guiding surface 60 to engage the pins 52 and guide the lower portion of the lock member and particularly the spring tongue 54 between positions above the tape blade 30 and in contact with the tape blade 30. The guiding surface 60 is formed by a ridge 62 molded in the side wall 24 of the housing. The guiding surface 60 defines a descending path that continues along the curvature defined by the guide means. An opposing surface 64 is formed by a molded edge in the side wall 24. As may be understood by comparing FIG. 2 and FIG. 3, the pins 52 are movable in a groove defined between the guiding surface 60 and the opposing surface 64.

An upper end of the guiding surface 60 includes an arcuate recess 65 to receive the pins 52 at a fully unlocked position, best seen in FIG. 2. The recess 65 helps to retain the lock member 40 in the fully unlocked position.

At the lower end of the ridge 62 adjacent the guiding surface 60 is detente means for releasably securing the lock member in a locked position. The detente means may comprise a bump-like projection or protrusion formed in the ridge 62 for producing a change in direction of the path defined by the guiding surface 60. Movement of the pins from the guiding surface 60 over the detente means forces the spring tongue 54 against the tape blade 30 and produces a bend in the spring tongue 54. The detente means also provides a surface against which the pins may press so that the tongue 54 exerts a force on the tape blade 30.

According to a preferred embodiment, the detente means includes a lock surface 66 formed at the lower end of the guiding surface. The lock surface 66 is formed on a plane that intersects the guiding surface 60 so that a corner or protrusion 68 is formed between the guiding surface 60 and the lock surface 66. The opposing surface 64 is substantially parallel to the guiding surface 60 in an upper part and includes a curved or hooked end portion 67 across from the lock surface 66 that helps to guide the pins 52 over the protrusion 68 onto the lock surface 66.

Figure 5:
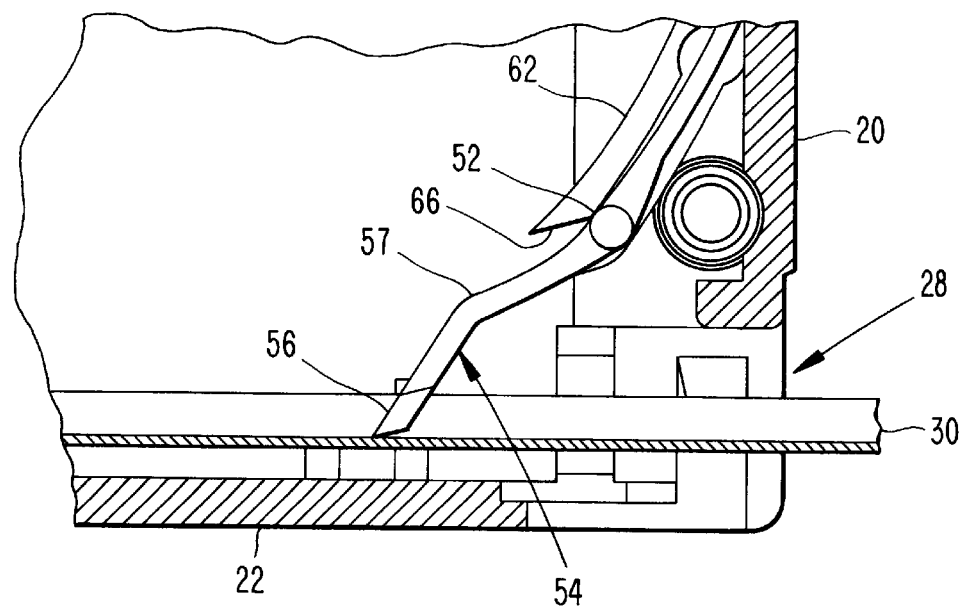

In the fully unlocked position shown in FIG. 2, the pins 52 are positioned in the arcuate recess 65 with the tongue 54 above and out of contact with the tape blade 30. By guiding the finger pad 42 in the direction of the bottom wall 22, the pins 52 move along the guiding surface 60 to the protrusion 68. As shown in FIG. 5, with the pins 52 at the lower part of the guiding surface 60 adjacent the protrusion 68, the tip 56 of the tongue 54 is in contact with the tape blade 30. This initial movement toward the locked position also produces a flexing in the lock member body 44 at about the portion including the wings 50.

Continued movement of the lock member 40 toward the bottom wall causes the pins 52 to move over the protrusion 68 and onto the lock surface 66, illustrated in FIG. 3. The movement of the pins 52 over the protrusion causes the tip 56 of the tongue 54 to slide along the tape blade 30 away from the housing opening 28 and forces the tongue 54 to bend, which, as may be seen by comparing FIG. 5 and FIG. 3, flattens the bend 57 in the tongue. The lock member 40 is formed of a flexible, resilient material, and flattening of the bend 57 provides a spring force in the tongue 54 which acts between the lock surface 66 and the tape blade 30. The tongue 54 thus clamps the tape blade 30 against the bottom wall 22.

In addition, the movement of the pins 52 over the protrusion 68 produces a snap or click that is felt in the finger pad 42 and a produces clicking sound, both of which indicate to the user that the lock member has reached the locking position.

The invention has been described in terms of preferred principles and illustrative embodiments, however, the invention is not limited to the embodiments shown and described. Those skilled in the art will understand that substitutions and equivalents may be used without departing from the scope of the invention as defined in the following claims.

What is claimed is:

1. A retractable tape measure device comprising:

a coilable measuring blade;

a housing containing the measuring blade, the housing including opposing side walls, a bottom wall, and a peripheral wall between the side walls, a bottom front portion of the peripheral wall having an opening for movement therethrough of the measuring blade, bearing means to support and guide the measuring blade through the opening, each of the opposing side walls having on an interior surface a guide ridge extending from an upper position adjacent the peripheral wall downward and rearward to a lower position, each of the guide ridges having an arcuate recess at an upper end, a lock surface at a lower end, and a guide surface between the arcuate recess and the lock surface, each of the lock surfaces being oblique to the respective guiding surface, and a protrusion being formed between the guiding surface and the lock surface of each of the ridges; and a lock member slidably mounted in the housing, the lock member having a unitary longitudinally elongated and curved body, the body including laterally extending follower means that engage the guide ridge in each side wall and having a curved resilient tongue extending freely from the body rearward and downward, the tongue having a tip obliquely bent toward the bottom wall, the lock member being selectably slidably movable for at least three positions including:

an unlocked position with the follower means positioned in the arcuate recesses, wherein the tongue is positioned above the measuring blade, a contact position with the follower means on the guiding surfaces adjacent the protrusion wherein the tip of the tongue is in contact with the measuring blade on the bearing means, and a locked position with the follower means positioned on the lock surfaces to press the tip of the tongue against the measuring blade on the bearing means, wherein the tongue extends downward and rearward from the lock surfaces to the measuring blade in a deflected state to produce locking pressure on the measuring blade against the bearing means.

2. The device as claimed in claim 1, wherein the follower means comprises pins extending laterally from the body.

3. The device as claimed in claim 1, wherein the lock member further comprises a finger pad for manually positioning the lock member.

4. The device as claimed in claim 1, wherein each guiding surface is formed with a curvature convex in the direction of the opening, and each lock surface is formed on a plane that intersects the curvature of the respective guiding surface.

5. The device as claimed in claim 4, wherein each lock surface faces the bottom wall of the housing.

6. The device as claimed in claim 1, wherein in each side wall the guiding surface is formed by an upper ridge formed in the respective side wall, the guide means further comprising a lower ridge on each sidewall and spaced from the respective upper ridge and defining therebetween a groove, each lower ridge having a lower end portion that is curved toward the respective lock surface to guide the follower means over the protrusion.

7. The device as claimed in claim 1, wherein the housing has a D shape, the peripheral wall having a curvature from a front portion above the opening to a rear portion, and wherein the lock member curvature is substantially equal to the curvature of the peripheral wall.

8. The device as claimed in claim 1, wherein moving the lock member from the contact position to the locked position causes the tongue to slide along the measuring blade away from the opening.

9. The device as claimed in claim 1, wherein each of the side walls further includes a channel above the respective guide ridge to guide and constrain an upper portion of the lock member body, the channel having a curvature to match the curvature of the lock member body, wherein in the locked position, the curvature in the upper portion of the body is flexed.

* * * * *